United States Patent [19]

Johnson

[11] 4,307,606
[45] Dec. 29, 1981

[54] THERMAL TRANSITION ZONE SENSING AND INDICATING SYSTEM

[76] Inventor: Hugh G. Johnson, 1284 Ridge Rd., Laurel Hollow, N.Y. 11791

[21] Appl. No.: 150,510

[22] Filed: May 16, 1980

Related U.S. Application Data

[63] Continuation-in-part of Ser. No. 47,956, Jun. 11, 1979.

[51] Int. Cl.³ ............................................. G01F 23/22
[52] U.S. Cl. ......................................... 73/295; 73/340
[58] Field of Search ................................. 73/294, 340

[56] References Cited

U.S. PATENT DOCUMENTS

| | | | |
|---|---|---|---|
| 1,633,298 | 6/1927 | Wanamaker | 73/340 |
| 3,485,100 | 12/1969 | Petersen | 73/295 |
| 3,696,675 | 10/1972 | Gilmour | 73/295 |
| 4,020,243 | 4/1977 | Oldford | 324/426 |

FOREIGN PATENT DOCUMENTS 588950  6/1947  United Kingdom ................. 73/304

Primary Examiner—Donald O. Woodiel
Attorney, Agent, or Firm—Nolte and Nolte

[57]  ABSTRACT

The location of a thermal transmition zone in a water storage tank is detected by a number of temperature responsive electrical elements arranged on the exterior surface tank, out of contact with the water, and at selected locations thereon corresponding to thermal transition zone levels within the tank; visual indicating means are connected to the sensing element and are in an arrangement to correspond to the location of the elements on the tank such that, upon the temperature sensing elements detecting the location of the thermal zone, a corresponding visual indication is provided.

24 Claims, 4 Drawing Figures

THERMAL TRANSITION ZONE SENSING AND INDICATING SYSTEM

BACKGROUND OF THE INVENTION

This is a continuation-in-part application of my co-pending application, Ser. No. 047,956 filed June 11, 1979.

The field of this invention relates to the indication of the quantity of heated water currently available for use in a storage tank. Prior to the present time, there has been little or no need for such indication, since hot water tanks are usually controlled continuously to maintain essentially a full tank of heated water. Thus, the typical present home installation includes a properly sized automatic recovery water heating system. Currently there are water storage tanks that are supplied with heated water only periodically, e.g., from solar panels or from a heater timed to operate only at off-peak power times, so as to take advantage of the newly offered lower rates. Based on the worldwide energy situation, it is quite likely that this kind of water heating will become more prevalant. When such water heating is not continuous, it is necessary to know the quantity of heated water available before undertaking a use which may require more heated water than is stored in the tank. Therefore, a system for sensing and indicating the quantity of heated water within a water storage tank is becoming a necessity.

SUMMARY OF THE INVENTION

According to the present invention, a plurality of temperature sensing means are arranged at suitable levels in thermal contact with the exterior of the wall of the storage tank. The sensors are connected to a power source and employ indicators which are arranged to indicate to the consumer the location of the hot-cold transitional area in the tank, thereby providing a quantitative measurement of the amount of heated water available.

One embodiment employs thermostatic switches as the sensing means, a regulated DC power supply, and a plurality of parallel arranged Zener diodes for controlling light emitting diodes which light sequentially to indicate the location of the transitional zone of the heated water in the storage tank. In another embodiment, sensing is provided by solid-state sensing elements which control the illumination of light emitting diodes. Either a conventional battery of an alternating current source may be employed as the power supply in such embodiment.

Therefore, it is an object of the present invention to provide a system which detects the location of the transitional zone between heated water and cooled water in a storage tank and which provides a visual display indicating the quantity of heated water available.

The manner in which this object and other objects are accomplished by the present invention will be discerned from the following detailed description.

DETAILED DESCRIPTION OF THE INVENTION

Figure 1:
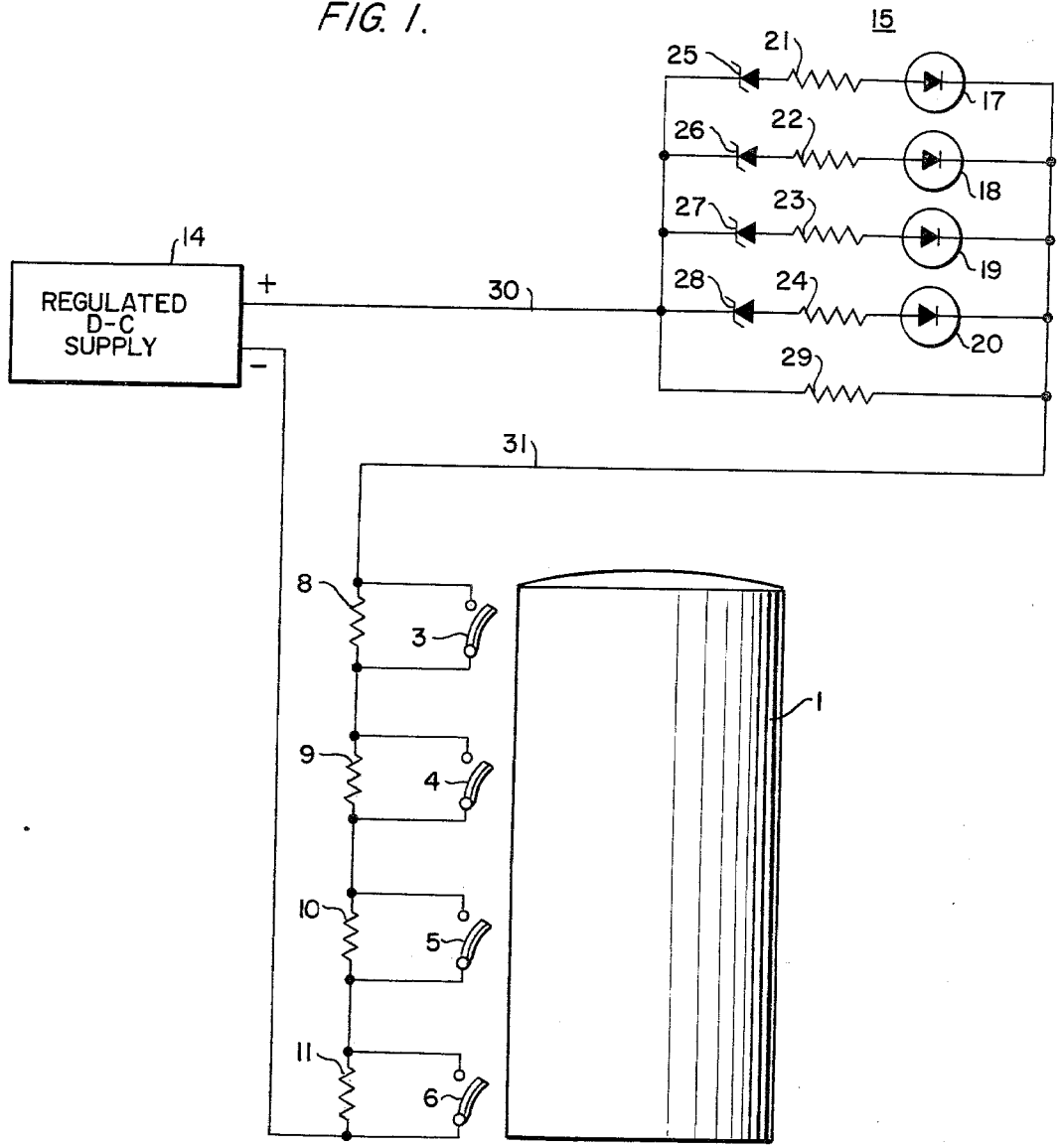
FIG. 1 is a schematic illustration of one embodiment of the present invention.

Referring now to FIG. 1, a storage tank 1 having conventional inlet and outlet water connections, not shown, is adapted to contain water at regular line pressure. A suitable water heating means, such as a heat exchanger, heating coil, or solar panel, not shown, and forming no part of this invention, are also provided either internally or externally of the tank.

A plurality of thermostatic switches 3, 4, 5, and 6 are arranged at different respective levels and are placed in thermal contact with the exterior of the tank 1 wall and out of contact with the heated water.

It is preferable that the thermostatic switches be arranged in contact with the outer surface of the tank actually holding the water. In the event that such storage tank is fully insulated, then it is desirable that the outer shell and the insulation be pierced, so that the thermal sensors may make thermal contact with the exterior wall of the inner tank. The inventive system is adapted to retrofit existing water tanks, however, the present invention could also be installed on the tank at the time it is manufactured. Any number of switches may be employed and may be arranged at various locations on the tank; however, it has been found that an approximate ten to twelve inch vertical spacing between sensors provides sufficient resolution to permit the homeowner to easily and readily determine the quantity of heated water available for use. Sensors 3 through 6 are normally open, as shown, at room temperature and are designed to close, for example, upon the temperature rising to 140° F. and to open when the temperature drops to 130° F. Switches 3 through 6 are shunted by resistors 8, 9, 10, and 11, respectively. Resistors 8 through 11 are connected in series with each other between a regulated DC power supply 14 and a visual display system, generally designated at 15. The power supply 14 may be of any conventional kind designed to provide a regulated output voltage of, e.g., 15 volts DC. The readily available 6 volt DC bell transformer using half-wave rectification could also be employed, provided that the circuit element values are adjusted accordingly.

The visual display system 15 may comprise a plurality of any low-power visual indicator means or illuminating devices, such as light emitting diodes (LEDs) 17, 18, 19, and 20. LEDs 17 through 20 are provided with series resistors 21, 22, 23, and 24, and Zener diodes 25, 26, 27, and 28, respectively. The diode-resistor series combinations are connected in parallel to each other across a load resistor 29, which is in series with the thermostatic switches 3 through 6 and the power supply 14. It is noted that visual display system 15 may be located at any convenient point remote from the water supply tank 1. This is convenient in this embodiment because the visual display system 15 is connected to the remainder of the system by only two wires, 30 and 31, which carry a maximum current of only several milliamperes at 15 volts.

The Zener diodes, 25 through 28, are chosen to exhibit reverse breakdown at different voltages, e.g., 6, 8, 10, and 12 volts, respectively. Similarly, the value of resistors 8 through 11 and load resistor 29 are chosen so that when all thermostatic switches, 3 through 6, are closed, sufficient voltage will appear across load resistor 29 to cause a breakdown of all Zener diodes, 25 through 28, thereby causing all light emitting diodes, 17 through 20, to be illuminated.

In the situation where thermostatic switch 6 is open, a resistor 11 will thereby be placed in series with resistor 29 and, thus, a voltage will appear across resistor 29 which is insufficient to break down Zener diode 28, but which is sufficient to breakdown Zener diodes 25, 26, and 27, thereby causing light emitting diodes 17, 18, and 19 to be illuminated, but not light emitting diode 20. Similarly, as switches 5, 4, and 3 open in succession, light emitting diodes 19, 18 and 17 will cease to be illuminated.

Suitable values for the resistors employed in the embodiment of FIG. 1 are as follows:

| Resistor | Ohms |
| --- | --- |
| 8 | 46 |
| 9 | 80 |
| 10 | 187 |
| 11 | 215 |
| 24 | 90 |
| 21–23, 29 | 330 |

The operation of FIG. 1 will now be set forth. As is well known, when water is heated it becomes less dense, thus, when heating water in a tank, the warmer water will move to the upper portions of the tank. Because the physical properties of water make it a relatively poor conductor of heat, stratification readily occurs. In other words, there will be a fairly definite thermal transition plane or zone between an upper body of heated water and a lower body of cooler water. It is this zone which is being detected and indicated as such to the consumer by the present invention. As more and more water is heated, the transitional plane or transitional zone descends in the tank and as more heated water is withdrawn, the plane or zone rises in the tank.

In the embodiment of FIG. 1, when the tank contains no heated water, all switches 3 through 6 will remain open and all light emitting diodes 17 through 20 will remain off. As increasing amounts of heated water are provided, switches 3 through 6 close in succession, thereby causing diodes 17, 18, 19, and 20 to be illuminated in succession. This provides an easily interpreted indication of the quantity of heated water available at all times.

Figure 2:
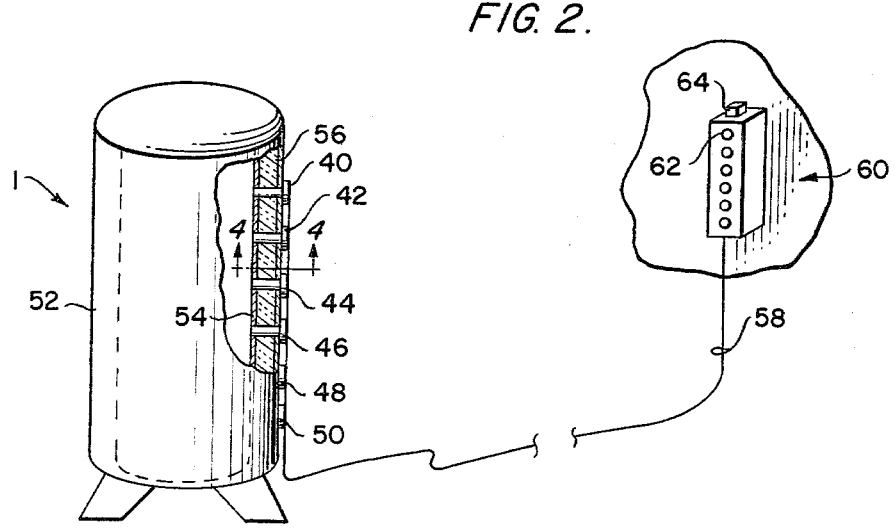
FIG. 2 is a pictorial representation of the invention installed on a typical hot water storage tank.

Referring now to FIG. 2, the water storage tank 1 of FIG. 1 is shown having an alternate embodiment of the present invention installed thereon. In this embodiment a number of sensors are employed, shown for example at 40, 42, 44, 46, 48, and 50. While six sensors are shown in this embodiment, it has been found that four sensors installed on the typical water tank provide more than adequate resolution and that as few as three sensors give a meaningful indication of the available heated water supply. These sensors are arranged to penetrate the outer metal shell 52 of the water tank 1, and to contact the exterior of the innermost water storage tank 54. Typically, in the space between the outer surface 52 and the inner tank 50 is arranged suitable thermal insulation, shown at 56. The sensors, 40 through 50, are interconnected with suitable electrical connectors and a multistrand electrical connector 58, that connects the sensors to the power and indicating unit 60. The number of conductors required is n+1, where n is the number of sensors employed. In the embodiment shown, it has been found that a seven-conductor flat cable works advantageously. This indicating unit 60 may be located at any remote location and may be arranged in the dwelling space at the location where the heated water is to be utilized, for example in the laundry room, or at a location suitably convenient such as where the conventional heating thermostat is located. The indicating and power unit 60 is provided with a plurality of visual indicating means, one of which is shown typically at 62 and is also provided with an actuation switch means 64.

Figure 3:
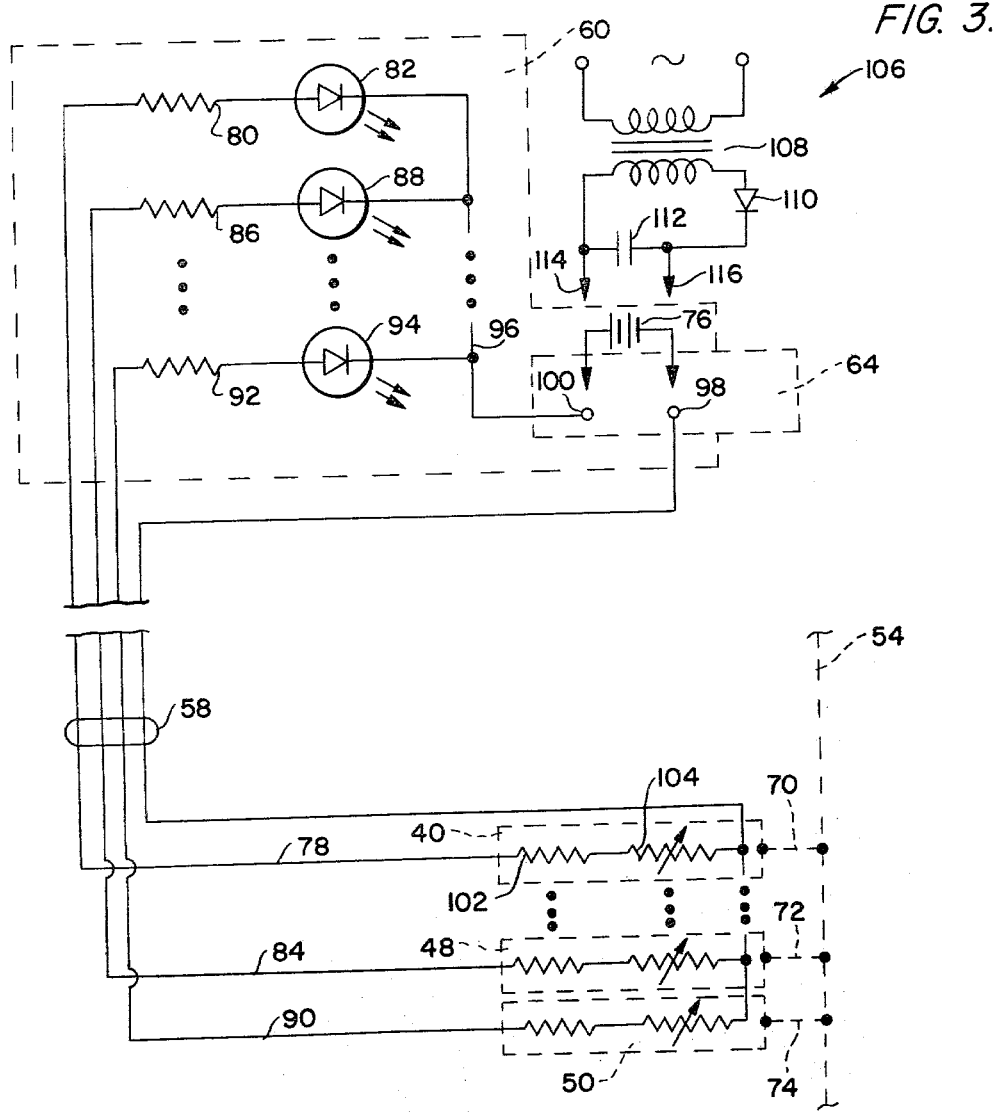
FIG. 3 is a schematic diagram of an alternate embodiment of the present invention.

The specific construction of the embodiment of FIG. 2 is shown in the schematic diagram of FIG. 3. Although there are six sensors shown in FIG. 2, it is understood that any number of sensors might be employed and, in order to simplify the schematic of FIG. 3, only three sensors are shown. Additionally, the wall of the tank 54 is represented by dashed line 54, located adjacent thereto are the sensors 40, 48, and 50. These sensors are represented as being in thermal contact with the tank wall 54 by dashed lines 70, 72, and 74. Each sensor, 40 through 50, is connected to the respective light emitting diode through a low-voltage power source, represented by battery 76. More specifically, sensor 40 is connected via line 78 through a current limiting resistor 80 to a light emitting diode 82. Similarly, sensor 48 is connected via line 84 through a limiting resistor 86 to a light emitting diode 88, and sensor 50 is connected via line 90 through current limiting resistor 92 to a light emitting diode 94. These light emitting diodes 82, 88, and 94 are connected to the power source through line 96.

The use of these current limiting resistors is not essential and are used principally when battery voltages greater than the illuminating means ratings are used. Such higher voltage batteries may be employed because they are readily available. For example, nine-volt transistor radio batteries are readily available and inexpensive, but the voltage should be reduced somewhat for optimum performance.

If the power source is a battery 76, as in the present embodiment, then the switch 64 comprises a momentary contact switch, shown schematically in FIG. 3. If an alternating current source is available, then the indicating lamps or light emitting diodes can be energized continuously for constant illumination. In this embodiment it has been found that a suitable design utilizes the battery itself to achieve the switching function by arranging the contacts, shown schematically at 98 and 100, directly beneath the corresponding contacts of the battery. The battery 76, which in the present embodiment is a 9 volt transistor battery, has both contacts located on the same end. Thus, by the use of a spring means, such as a piece of flexible plastic foam located beneath the battery, upon depressing the battery, the terminals thereof will contact wire ends 98 and 100 and the circuit will be made. Upon release of the battery, the flexible plastic means will cause the battery 76 to break contact with the wires, 98 and 100. If the power source is conventional 110 VAC rectified to a suitable DC voltage, then a conventional push-button used to turn on and off the inventive circuit or the system can be left constantly energized and the switch eliminated.

Each of the sensor elements, 40 through 50, are identical and are preferably of the type known as a Moxie, distributed by Canadian Thermostats and Control Devices Ltd., of Montreal, Canada. These elements are solid-state devices based on the properties of the oxides of specific transition-group metals, and may be schematically represented by a fixed resistor 102 and a variable resistor 104. Since each of the sensors are identical, only sensor 40 will be discussed. The fixed resistor 102 represents a nominal resistor which has a minimum value of approximately 20 to 100 ohms. The variable resistor 104 is a negative temperature coefficient resistance with a narrow transition region in which the temperature coefficient of resistance can be as high as 300%/° C. When the temperature is around 30° to 40° C. it will have a value between 100,000 and 1,000,000 ohms. When the temperature rises above the transitional level, the variable resistor 104 will drop to essentially zero resistance and, thus, the sensor 40 presents a resistance which is represented solely by the fixed portion 102. When sensor 40 presents the minimum resistance and switch 64 is actuated to place the battery in the circuit, then LED 82 will be energized and illuminated. The power placed on these Moxie devices should be kept low to prevent self heating. In this regard, it is possible to employ two 1.5 volt batteries in place of the 9 volt transistor battery, in which case the limiting resistors could be eliminated.

FIG. 3 also shows a transformer assembly 106 which can be substituted for the battery 76. The transformer assembly 106 can employ a step-down transformer 108 connected to a suitable AC supply and halfwave rectification and smoothing could be provided by a diode 110 and a capacitor 112, respectively. The transformer assembly 106 output at points 114 and 116 are connected to the system at contacts 98 and 100. No switch is necessary when using AC power.

Figure 4:
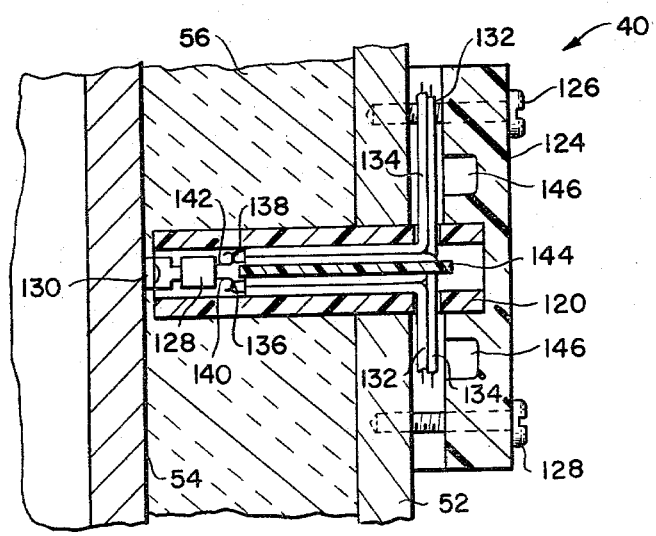
FIG. 4 is a cross-sectional detail of a portion of the present invention taken along section lines 4—4 in FIG. 3.

Referring now to FIG. 4, the manner in which the sensors in the embodiment of FIG. 3 are affixed to the water storage tank is shown in more detail. Specifically, FIG. 4 is a cross section taken along section lines 4—4 of FIG. 2 and taken specifically through sensor 40. In FIG. 4, the outer surface 54 of the water storage tank is shown in relation to the thermal insulation 56 and the outer shell 52 of the water storage tank. The sensor 40 then must pierce the outer metal shell 52 and penetrate the insulation 56 so as to be in thermal contact with the holding tank surface 54. Sensor 40 comprises a tube 120, formed of plastic material such as acrylonitride-butadiene-styrene (ABS). Affixed to the tube 120 is a mounting block 124 which may be formed of a similar plastic or of any kind of fibrous nonmetallic material. The tube 120 is then firmly affixed to the attaching plate 124. The mounting plate 124 has suitable holes formed therein so that sheet-metal screws 126 and 128 may be utilized in attaching the sensor 40. In accomplishing such mounting, a clearance hole is drilled in the outer skin 52 having a diameter substantially equal to the diameter of the tube 120 and then pilot holes are drilled in the skin 52 for the screws 126 and 128. The tube 120 should be somewhat longer than the exact dimension necessary to account for manufacturing tolerances in the tank, as well as expansion/contraction of the metal parts. The distance between the inner tank 54 and the outer wall 52 may vary and this variance may be accommodated by the use of the longer tube 120 and the manner in which the screws 126 and 128 are tightened. Additionally, by screwing the sensor 40 into the outer case 52 of the tank, the flexibility of this outer case or jacket is utilized as a spring to maintain contact between the tank 54 and the thermal sensor during the normal thermal expansion and contraction of the water storage tank.

The tube 120 has fixed therein the Moxie 128 which is formed having a metal tab 130 on one end. In a preferred embodiment this metal tab is bent over so that it will make good thermal contact with the surface 54. The electrical wires, 130 and 132, are connected to the Moxie and are wired in accordance with the circuit shown in FIG. 3. In order to maintain the orientation of the Moxie 128 in the tube 120, it is acceptable to utilize a suitable potting compound. Additionally, to improve the thermal conductivity between the Moxie and the tank surface 54, use of a silicone grease may be advantageous.

Wires 132, 134 are connected to the Moxie device 128 by removing a portion of the insulation at the appropriate point along the length of each wire and forming the conductor of the wire into a loop at that point. The loops in wires 132 and 134 are at 136 and 138, respectively. The ends of the leads 140, 142 of the Moxie device 128 are formed having similar compatible loops. The loops in leads 140, 142 are hooked over the loops 136, 138 in leads 132, 134 and the connections soldered. In this manner, the connections have mechanical strength, as well as electrical continuity. Additionally, once the electrical joints are made, a plastic or fiber insert 144 can be inserted into the tube 120 to wedge the wires 130, 132 and providing strain relief for the electrical joints.

Because it may be necessary to place a relatively large slot or hole in the tube 120 to permit the wires 130, 132 to enter and exit, grooves 146 or slots may be cut or milled on the inner surface of plate 124 to provide space for the wires while increasing the amount of area for the plate 124 to be bonded to the tube 120.

It is understood, of course, that the foregoing is presented by way of example only, and is not intended to limit the scope of the present invention, except as set forth in the appended claims. For example, in place of screwing the sensor into the jacket of the water tank, a clip or spring arrangement could be employed so that only one hole per sensor need be drilled in the jacket.

What is claimed is:

1. Apparatus for indicating the location of a thermal transition zone between heated fluid and unheated fluid, in a storage tank, comprising;
    a plurality of temperature sensitive devices arranged in a predetermined manner and in thermal contact with an exterior surface of the tank;
    said devices being adapted to present a first electrical resistance above a predetermined temperature and a second electrical resistance below said temperature;
    voltage supply means electrically connected to said plurality of devices; and
    display means electrically connected to said plurality of devices and to said voltage supply means, said display means being responsive to said first electrical resistance for providing an indication corresponding to the number of said plurality of devices which are above said predetermined temperature, thereby indicating the location of the thermal transition zone in the storage tank.

2. The apparatus of claim 1, wherein said display means includes means interconnecting said plurality of devices for presenting a resultant resistance dependent upon the number of devices above said predetermined temperature.

3. The apparatus of claim 1, wherein said temperature sensitive devices are normally open thermostatic switches that close upon attainment of said predetermined temperature, each of said switches being shunted by a respective resistor, connected in series to provide said resultant resistance.

4. The apparatus of claim 2, wherein said display means includes a fixed resistor connected in series with said voltage supply means and said resultant resistance, and means responsive to the voltage drop across said fixed resistor, to indicate the location of said transition zone.

5. The apparatus of claim 4, wherein said means responsive to the voltage drop across said fixed resistor comprises a plurality of electrically energizable visual indicators, each provided with means effecting energization of the respective indicator upon application of more than a respective different voltage, said indicator and energization effecting means being connected to said fixed resistor.

6. The apparatus of claim 5, wherein said electrically energizable visual indicators are light emitting diodes, and said energization effecting means are Zener diodes having respective different reverse breakdown voltages, each being connected in series with its respective light emitting diode.

7. The apparatus of claim 1, wherein said temperature sensitive devices comprise solid state devices having no moving parts.

8. The apparatus of claim 1, wherein said voltage supply means comprises a dry cell battery.

9. The apparatus of claim 8, further including a pushbutton contact switch arranged in series with said battery.

10. The apparatus of claim 1, wherein said voltage supply means comprises a transformer.

11. A system for indicating the amount of heated water available for use in a storage tank by determining the location of a thermal transition zone located between heated and unheated water in the tank, the system comprising;
- a plurality of solid-state temperature sensitive devices arranged in thermal contact with the exterior of the tank so as not to be in contact with the water in the tank, said devices being adapted to present a first resistance above a predetermined temperature and a second resistance below said temperature;
- a plurality of indicating means arranged corresponding to the location of said temperature sensitive devices on the tank, each being connected to a corresponding one of said devices;
- a power source connected between each of said plurality of devices and said plurality of indicating means, whereby
- upon said temperature sensitive devices presenting said first resistance, a corresponding one of said indicating means is energized by the power source, for indicating the location of the thermal transition zone and the amount of heated water in the tank.

12. The system of claim 11, further including switch means connected to said power source such that said power source is electrically connected between said plurality of devices and said corresponding plurality of indicating means only upon actuation of said switch means.

13. The system of claim 11, further including means for connecting one of said plurality of temperature sensitive devices with a corresponding one of said plurality of indicating means in series, and each of said series connections being arranged in parallel with said power source.

14. The system of claim 11, wherein said solid-state temperature sensitive devices comprise Moxie devices.

15. The apparatus of claim 11, wherein said solid-state temperature sensitive devices are arranged at the end of a plastic tube, and including mounting means for holding said temperature sensing device in thermal contact with the storage tank.

16. The apparatus of claim 15, wherein said tube and said mounting means comprise temperature resistant plastic.

17. The apparatus of claim 11, wherein said means connecting said temperature sensitive devices and said indicating means include a plurality of insulated electrical wires, each having portions of the insulation removed thereby exposing the inner conductor formed into a loop for making electrical contact with the temperature sensitive devices.

18. The apparatus of claim 17, further including a plurality of nonmetallic insert means, one disposed in each of said tubes for securing said wires in said tube.

19. Apparatus for indicating the location of a thermal transition zone between heated and unheated water in a storage tank, comprising;
- a plurality of temperature sensitive devices arranged in thermal contact with the outside of the tank and being located thereon at points corresponding to different thermal transition zone levels within the tank;
- said devices being adapted to present a first electrical resistance above a predetermined temperature and a second electrical resistance below said temperature;
- means interconnecting said devices to present a resultant resistance dependent upon the number of devices above said temperature; and
- display means responsive to said resultant resistance to indicate the location of the transition zone.

20. The apparatus of claim 19, wherein said temperature sensitive devices are normally open thermostatic switches that close upon attainment of said temperature, each said switch being shunted by a respective resistor, with the combination being connected in series to provide said resultant resistance.

21. The apparatus of claim 19, wherein said temperature sensitive devices are thermostatic switches, each connected in series with its respective resistor, and each switch/resistor combination being connected in parallel to provide said resultant resistance.

22. The apparatus of claim 19, wherein said display means includes a source of regulated voltage and a fixed resistor connected in series with each other and said resultant resistance, and further including means responsive to the voltage drop across said fixed resistor to indicate the location of the transition zone.

23. The apparatus of claim 22, wherein said means responsive to the voltage drop comprise a plurality of electrically energizable visual indicators, each provided with means for connecting the respective indicator to the source of regulated voltage upon application of a voltage exceeding respective predetermined voltages, said indicator and energization effecting means being connected to said fixed resistor.

24. The apparatus of claim 23, wherein said electrically energizable visual indicators are light emitting diodes, and said energization effecting means are zener diodes having respective different reverse breakdown voltages, each being connected in series with a respective light emitting diode.

* * * * *